United States Patent
Kim et al.

(10) Patent No.: US 8,557,928 B2
(45) Date of Patent: Oct. 15, 2013

(54) LIQUID CRYSTAL ALIGNMENT AGENT, LIQUID CRYSTAL ALIGNMENT FILM MANUFACTURED USING THE SAME, AND LIQUID CRYSTAL DISPLAY DEVICE INCLUDING THE LIQUID CRYSTAL ALIGNMENT FILM

(75) Inventors: Eun-Ha Kim, Uiwang-si (KR);
Myoung-Youp Shin, Uiwang-si (KR);
Jae-Deuk Yang, Uiwang-si (KR);
Yong-Sik Yoo, Uiwang-si (KR);
Guk-Pyo Jo, Uiwang-si (KR);
Jung-Gon Choi, Uiwang-si (KR)

(73) Assignee: Cheil Industries Inc., Gumi-si (KR)

( * ) Notice: Subject to any disclaimer, the term of this patent is extended or adjusted under 35 U.S.C. 154(b) by 62 days.

(21) Appl. No.: 13/242,192

(22) Filed: Sep. 23, 2011

(65) Prior Publication Data
US 2012/0190801 A1    Jul. 26, 2012

(30) Foreign Application Priority Data
Jan. 24, 2011 (KR) .................. 10-2011-0006889

(51) Int. Cl.
  *C08G 73/10* (2006.01)
  *C08G 73/12* (2006.01)
  *C08L 79/08* (2006.01)

(52) U.S. Cl.
  USPC ........... 525/421; 525/422; 525/426; 525/432; 525/436; 528/335; 528/338; 528/339; 528/345; 528/350; 528/353

(58) Field of Classification Search
  USPC .......... 525/421, 422, 426, 432, 436; 528/335, 528/338, 339, 345, 350, 353
  See application file for complete search history.

(56) References Cited

U.S. PATENT DOCUMENTS 7,303,792 B2    12/2007    Hosaka et al.

FOREIGN PATENT DOCUMENTS

| JP | 2008-203641 | 9/2008 |
| JP | 2008-262170 | 10/2008 |
| JP | 2009-037104 | 2/2009 |
| KR | 10-2005-0084995 A | 8/2005 |
| KR | 10-0837788 B1 | 6/2008 |
| KR | 10-2010-0057086 A | 5/2010 |
| WO | 2008/153286 A2 | 12/2008 |

*Primary Examiner* — Ana Woodward
(74) *Attorney, Agent, or Firm* — Summa, Additon & Ashe, P.A.

(57) ABSTRACT

A liquid crystal alignment agent is provided that includes a polymer including polyamic acid including a repeating unit represented by the following Chemical Formula 1, polyimide including a repeating unit represented by the following Chemical Formula 2, or a combination thereof.

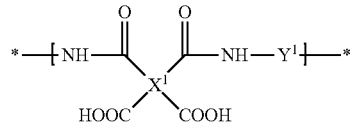

[Chemical Formula 1]

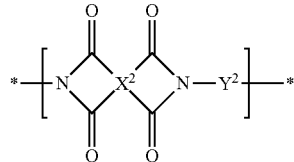

[Chemical Formula 2]

In Chemical Formulae 1 and 2,
each $X^1$, $X^2$, $Y^1$ and $Y^2$ is the same as in the detailed description.

10 Claims, No Drawings

LIQUID CRYSTAL ALIGNMENT AGENT, LIQUID CRYSTAL ALIGNMENT FILM MANUFACTURED USING THE SAME, AND LIQUID CRYSTAL DISPLAY DEVICE INCLUDING THE LIQUID CRYSTAL ALIGNMENT FILM

CROSS-REFERENCE TO RELATED APPLICATION

This application claims priority under 35 USC Section 119 to and the benefit of Korean Patent Application No. 10-2011-0006889 filed in the Korean Intellectual Property Office on Jan. 24, 2011, the entire disclosure of which is incorporated herein by reference.

FIELD OF THE INVENTION

The present invention relates to a liquid crystal alignment agent, a liquid crystal alignment film manufactured using the same, and a liquid crystal display including the liquid crystal alignment film.

BACKGROUND OF THE INVENTION

A liquid crystal display (LCD) includes a liquid crystal alignment film, and the liquid crystal alignment film is mainly made of polymer materials. The liquid crystal alignment film plays a role of a director in aligning liquid crystal molecules. When the liquid crystal molecules are moved by the influence of an electric field to display an image, the liquid crystal alignment film allows the liquid crystal molecules to be oriented in a predetermined direction. Generally, it is necessary to uniformly align the liquid crystal molecules in order to provide uniform brightness and a high contrast ratio to the LCD.

There is an increased demand for high quality LCDs. In addition, since LCDs are rapidly becoming larger, there is an increasing requirement for a highly productive liquid crystal alignment film. Accordingly, there is a need for a liquid crystal alignment film having a low defect rate in the LCD manufacturing process, excellent electro-optical characteristics, high reliability, and high performance that widely satisfies different characteristics for variously-developing LCDs. Further, there is a need for liquid crystal alignment materials that can provide optical stability and thermal stability with minimal or no after-image.

SUMMARY OF THE INVENTION

One embodiment of the present invention provides a liquid crystal alignment agent that can enable photo-alignment at small energy levels and can maintain excellent vertical alignment, provide excellent texture, improve sensitivity due to increased photo-reactivity, and minimize or prevent a luminance difference during operation.

Another embodiment of the present invention provides a liquid crystal alignment film manufactured using the liquid crystal alignment agent.

Yet another embodiment of the present invention provides a liquid crystal display including the liquid crystal alignment film.

According to one embodiment of the present invention, a liquid crystal alignment agent is provided that can include a polymer comprising polyamic acid including a repeating unit represented by the following Chemical Formula 1, polyimide including a repeating unit represented by the following Chemical Formula 2, or a combination thereof.

[Chemical Formula 1]

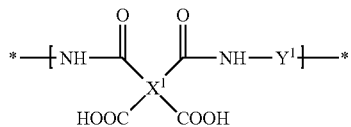

[Chemical Formula 2]

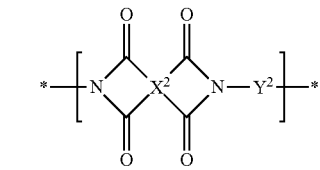

In Chemical Formulae 1 and 2, $X^1$ and $X^2$ are the same or different and are each independently a tetravalent organic group derived from alicyclic acid dianhydride or aromatic acid dianhydride, and $Y^1$ and $Y^2$ are the same or different and are each independently a divalent organic group derived from diamine, wherein the diamine includes a diamine or a combination of diamines represented by the following Chemical Formula 3.

[Chemical Formula 3]

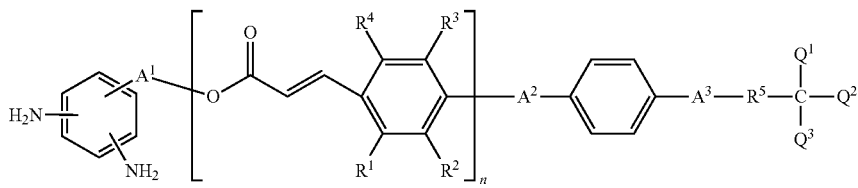

In Chemical Formula 3, $A^1$ is a single bond or C1 to C2 alkylene, $A^2$ is substituted or unsubstituted C1 to C30 alkylene or C1 to C10 alkylene wherein at least one —$CH_2$— group thereof is substituted with —O—, —OOC—, —COO—, —OCOO—, —NHCO—, —CONH— or —CO—, $A^3$ is a single bond, O, $SO_2$, or $C(R_{103})(R_{104})$, wherein $R_{103}$ and $R_{104}$ are the same or different and are independently hydrogen or substituted or unsubstituted C1 to C6 alkyl, $R^1$ to $R^4$ are the same or different and are each independently hydrogen, substituted or unsubstituted C1 to C30 alkyl, substituted or unsubstituted C6 to C30 aryl, or substituted or unsubstituted C2 to C30 heteroaryl, $R^5$ is substituted or unsubstituted C1 to C30 alkylene or C1 to C30 alkylene wherein at least one —$CH_2$— group thereof is substituted with —CO—, —CO—O—, —NW—, —NWCO—, —CO—NW— or —CH=CH—, wherein W is hydrogen or C1 to C10 alkyl, with the proviso that oxygen atoms are not directly bound to one another, $Q^1$, $Q^2$ and $Q^3$ are each independently hydrogen or halogen, and n is an integer ranging from 2 to 4.

The diamine may further include a diamine or a combination of diamines represented by the following Chemical Formula 4.

[Chemical Formula 4]

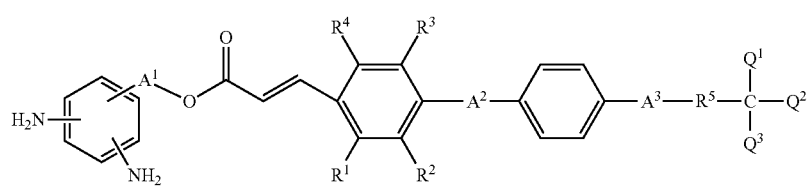

In Chemical Formula 4, $A^1$ is a single bond or C1 to C2 alkylene, $A^2$ is substituted or unsubstituted C1 to C30 alkylene group or C1 to C10 alkylene wherein at least one —CH$_2$— group thereof is substituted with —O—, —OOC—, —COO—, —OCOO—, —NHCO—, —CONH— or —CO—, $A^3$ is a single bond, O, SO$_2$, or C(R$_{103}$)(R$_{104}$), wherein R$_{103}$ and R$_{104}$ are the same or different and are independently hydrogen or substituted or unsubstituted C1 to C6 alkyl, $R^1$ to $R^4$ are the same or different and are each independently hydrogen, substituted or unsubstituted C1 to C30 alkyl, substituted or unsubstituted C6 to C30 aryl, or substituted or unsubstituted C2 to C30 heteroaryl, $R^5$ is substituted or unsubstituted C1 to C30 alkylene or C1 to C30 alkylene wherein at least one —CH$_2$— group thereof is substituted with —CO—, —CO—O—, —NW—, —NWCO—, —CO—NW— or —CH=CH—, wherein W is hydrogen or C1 to C10 alkyl, with the proviso that oxygen atoms are not directly bound to one another, and $Q^1$, $Q^2$ and $Q^3$ are each independently hydrogen or halogen.

The diamine may include about 20 mol % to about 90 mol % of the diamine represented by Chemical Formula 3 and about 10 mol % to about 80 mol % of the 20, diamine represented by Chemical Formula 4, based on the total amount of the diamine.

The diamine represented by Chemical Formula 3 may be a diamine or a combination of diamines represented by the following Chemical Formula 5.

n2 is an integer ranging from 0 to 2.

The polyamic acid may have a weight average molecular weight of about 50,000 to about 500,000.

The polyimide may have a weight average molecular weight of about 50,000 to about 500,000.

The liquid crystal alignment agent may include the polyamic acid and the polyimide at a weight ratio of about 1:99 to about 50:50.

The liquid crystal alignment agent may have about 1 wt % to about 30 wt % of a solid content.

According to another embodiment of the present invention, a liquid crystal alignment film manufactured using the liquid crystal alignment agent to a substrate is provided.

According to yet another embodiment of the present invention, a liquid crystal display including the liquid crystal alignment film is provided.

The liquid crystal alignment agent may perform photo-alignment at low energy levels, and may provide excellent texture, sensitivity, and the like.

DETAILED DESCRIPTION

The present invention will be described more fully hereinafter in the following detailed description of the invention, in which some but not all embodiments of the invention are described. Indeed, this invention may be embodied in many different forms and should not be construed as limited to the embodiments set forth herein; rather, these embodiments are provided so that this disclosure will satisfy applicable legal requirements.

As used herein, when a specific definition is not otherwise provided, the term "substituted" may refer to one substituted with a substituent including halogen (F, Br, Cl or I), hydroxy, nitro, cyano, amino (NH$_2$, NH(R$^{100}$) or N(R$^{101}$)(R$^{102}$), wherein R$^{100}$, R$^{101}$, and R$^{102}$ are the same or different and are each independently C1 to C10 alkyl), amidino, hydrazine,

[Chemical Formula 5]

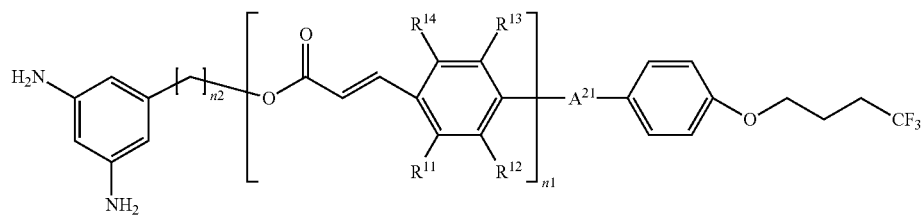

In Chemical Formula 5, $A^{21}$ is —O—, —OOC— or —COO—, $R^{11}$ to $R^{14}$ are the same or different and are each independently hydrogen or substituted or unsubstituted C1 to C10 alkyl, n1 is an integer ranging from 2 to 4, and hydrazone, carboxyl, substituted or unsubstituted alkyl, substituted or unsubstituted haloalkyl, substituted or unsubstituted alkoxy, a substituted or unsubstituted alicyclic organic group, substituted or unsubstituted aryl, substituted or unsubstituted alkenyl, substituted or unsubstituted alkynyl, substituted or unsubstituted heteroaryl, substituted or unsubstituted heterocycloalkyl, or a combination thereof, in place of at least one of hydrogen of a functional group.

As used herein, when a specific definition is not otherwise provided, the term "alkyl" may refer to C1 to C30 alkyl, for example C1 to C20 alkyl, the term "alkenyl" may refer to C2 to C30 alkenyl, the term "alkynyl" may refer to C2 to C30 alkynyl, the term "cycloalkyl" may refer to C3 to C30 cycloalkyl, for example C3 to C20 cycloalkyl, the term "heterocycloalkyl" may refer to C2 to C30 heterocycloalkyl, for example C2 to C20 heterocycloalkyl, the term "alkylene" may refer to C1 to C30 alkylene, for example C1 to C20 alkylene, the term "alkoxy" may refer to C1 to C30 alkoxy, for example C1 to C20 alkoxy, the term "cycloalkylene" may refer to C3 to C30 cycloalkylene, for example C3 to C20 cycloalkylene, the term "heterocycloalkylene" may refer to C2 to C30 heterocycloalkylene, for example C2 to C20 heterocycloalkylene, the term "aryl" may refer to C6 to C30 aryl, for example C6 to C20 aryl, the term "heteroaryl" may refer to C2 to C30 heteroaryl, for example C2 to C18 heteroaryl, the term "arylene" may refer to C6 to C30 arylene, for example C6 to C20 arylene, the term "heteroarylene" may refer to C2 to C30 heteroarylene, for example C2 to C20 heteroarylene, the term "alkylaryl" may refer to C7 to C30 alkylaryl, for example C7 to C20 alkylaryl, and the term "halogen" may refer to F, Cl, Br, or I.

As used herein, when a specific definition is not otherwise provided, the terms heterocycloalkyl, heterocycloalkylene, heteroaryl, and heteroarylene may independently refer to cycloalkyl, cycloalkylene, aryl, and arylene including 1 to 3 heteroatoms including N, O, S, Si, P, or a combination thereof in place of one or more carbon ring atoms.

As used herein, when a specific definition is not otherwise provided, the term "aliphatic" may refer to C1 to C30 alkyl, C2 to C30 alkenyl, C2 to C30 alkynyl, C1 to C30 alkylene, C2 to C30 alkenylene, or C2 to C30 alkynylene, for example C1 to C20 alkyl, C2 to C20 alkenyl, C2 to C20 alkynyl, C1 to C20 alkylene, C2 to C20 alkenylene, or C2 to C20 alkynylene, the term "alicyclic" may refer to C3 to C30 cycloalkyl, C3 to C30 cycloalkenyl, C3 to C30 cycloalkynyl, C3 to C30 cycloalkylene, C3 to C30 cycloalkenylene, or C3 to C30 cycloalkynylene, for example C3 to C20 cycloalkyl, C3 to C20 cycloalkenyl, C3 to C20 cycloalkynyl, C3 to C20 cycloalkylene, C3 to C20 cycloalkenylene, or C3 to C20 cycloalkynylene, and the term "aromatic" may refer to C6 to C30 aryl, C2 to C30 heteroaryl, C6 to C30 arylene, or C2 to C30 heteroarylene, for example C6 to C16 aryl, C2 to C16 heteroaryl, C6 to C16 arylene, or C2 to C16 heteroarylene.

As used herein, when a specific definition is not otherwise provided, the term "combination" may refer to mixture or copolymerization; and in the case of an alicyclic organic group and an aromatic organic group, a fused ring of two or more rings, or two or more rings linked by a single bond, O, S, C($=$O), CH(OH), S($=$O), S($=$O)$_2$, Si(CH$_3$)$_2$, (CH$_2$)$_p$ (wherein, $1 \leq p \leq 2$), (CF)$_{2q}$ (wherein, $1 \leq q \leq 2$), C(CH$_3$)$_2$, C(CF$_3$)$_2$, C(CH$_3$)(CF$_3$), or C($=$O)NH. As used herein, the term "copolymerization" may refer to block copolymerization or to random copolymerization, and the term "copolymer" may refer to a block copolymer or to a random copolymer.

"*" denotes a position linked to the same or different atom or Chemical Formula.

The liquid crystal alignment agent according to one embodiment of the present invention includes a polymer comprising polyamic acid including a repeating unit represented by the following Chemical Formula 1, polyimide including a repeating unit represented by the following Chemical Formula 2, or a combination thereof.

[Chemical Formula 1]

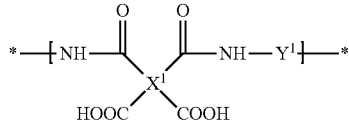

[Chemical Formula 2]

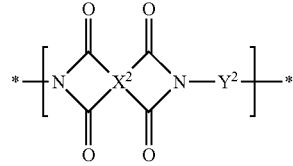

In Chemical Formulae 1 and 2, $X^1$ and $X^2$ are the same or different and are each independently a tetravalent organic group derived from alicyclic acid dianhydride or aromatic acid dianhydride. $X^1$ may be the same or different in each repeating unit, and $X^2$ may be the same or different in each repeating unit.

$Y^1$ and $Y^2$ are the same or different and are each independently a divalent organic group derived from diamine, wherein the diamine includes a diamine or a combination of diamines represented by the following Chemical Formula 3.

[Chemical Formula 3]

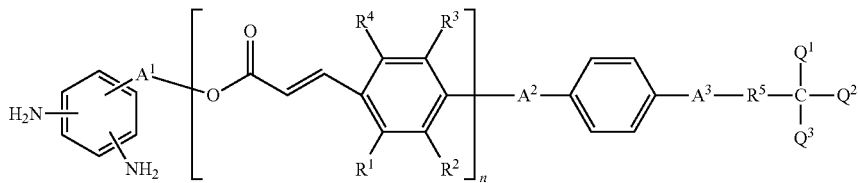

In Chemical Formula 3, $A^1$ is a single bond or C1 to C2 alkylene, $A^2$ is substituted or unsubstituted C1 to C30 alkylene or C1 to C10 alkylene wherein at least one —CH$_2$— group thereof is substituted with —O—, —OOC—, —COO—, —OCOO—, —NHCO—, —CONH— or —CO—, $A^3$ is a single bond, O, SO$_2$, or C(R$_{103}$)(R$_{104}$), wherein R$_{103}$ and R$_{104}$ are the same or different and are independently hydrogen or substituted or unsubstituted C1 to C6 alkyl, R$^1$ to R$^4$ are the same or different and are each independently hydrogen, substituted or unsubstituted C1 to C30 alkyl, substituted or unsubstituted C6 to C30 aryl, or substituted or unsubstituted C2 to C30 heteroaryl, R$^5$ is substituted or unsubstituted C1 to C30 alkylene or C1 to C30 alkylene wherein at least one —CH$_2$— group thereof is substituted with —CO—, —CO—O—, —NW—, —NWCO—, —CO—NW— or —CH=CH—, wherein W is hydrogen or C1 to C10 alkyl, with the proviso that oxygen atoms are not directly bound to one another, $Q^1$, $Q^2$ and $Q^3$ are each independently hydrogen or a halogen, and n is an integer ranging from 2 to 4.

In the above Chemical Formula 3, when n is 2 or more, the liquid crystal alignment agent may improve photo-reactivity and thus enable photo-alignment with a small amount of energy and also maintain excellent vertical alignment and provide excellent texture. In addition, the liquid crystal alignment agent may improve sensitivity due to increased photo-reactivity and prevent luminance difference during operation.

The diamine may include a diamine or a combination of diamines represented by the above Chemical Formula 3, or a mixture of the diamine(s) represented by the above Chemical Formula 3 and a diamine or a combination of diamines represented by the following Chemical Formula 4.

to about 50 mol % and the diamine represented by Chemical Formula 4 may be included in an amount of about 50 mol % to about 80 mol %.

In some embodiments, the diamine may include the diamine represented by Chemical Formula 3 in an amount of about 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, or 90 mol %. Further, according to some embodiments of the present invention, the amount of the diamine represented by Chemical Formula 3 can be in a range from about any of the foregoing amounts to about any other of the foregoing amounts.

[Chemical Formula 4]

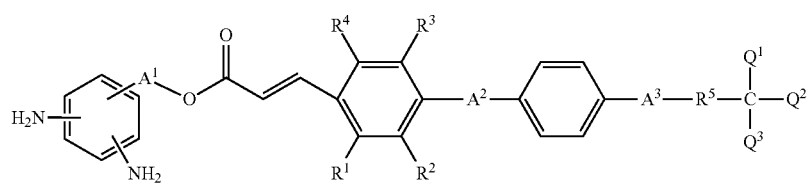

In Chemical Formula 4, $A^1$ is a single bond or C1 to C2 alkylene, $A^2$ is substituted or unsubstituted C1 to C30 alkylene or C1 to C10 alkylene wherein at least one —$CH_2$— group thereof is substituted with —O—, —OOC—, —COO—, —OCOO—, —NHCO—, —CONH— or —CO—, $A^3$ is a single bond, O, $SO_2$, or $C(R_{103})(R_{104})$, wherein $R_{103}$ and $R_{104}$ are the same or different and are independently hydrogen or substituted or unsubstituted C1 to C6 alkyl, $R^1$ to $R^4$ are the same or different and are each independently hydrogen, substituted or unsubstituted C1 to C30 alkyl, substituted or unsubstituted C6 to C30 aryl, or substituted or unsubstituted C2 to C30 heteroaryl, $R^5$ is substituted or unsubstituted C1 to C30 alkylene or C1 to C30 alkylene wherein at least one —$CH_2$— group thereof is substituted with —CO—, —CO—O—, —NW—, —NWCO—, —CO—NW— or —CH=CH—, wherein W is hydrogen or C1 to C10 alkyl, with the proviso that oxygen atoms are not directly bound to one another, and $Q^1$, $Q^2$ and $Q^3$ are each independently hydrogen or halogen.

The diamine may include about 20 mol % to about 90 mol % of the diamine represented by Chemical Formula 3 and about 10 mol % to about 80 mol % of the diamine represented by Chemical Formula 4 based on the total amount of the diamine. For example, the diamine represented by Chemical Formula 3 may be included in an amount of about 20 mol %

In some embodiments, the diamine may include the diamine represented by Chemical Formula 4 in an amount of about 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, or 80 mol %. Further, according to some embodiments of the present invention, the amount of the diamine represented by Chemical Formula 4 can be in a range from about any of the foregoing amounts to about any other of the foregoing amounts.

When the diamine represented by Chemical Formula 3 and diamine represented by Chemical Formula 4 are used in an amount within the above ranges, photo-reactivity can be improved, reactivity may be uniform throughout a film and thus an alignment film having excellent alignment properties and reliability may be provided.

The diamine represented by Chemical Formula 3 may be a diamine or a combination of diamines represented by the following Chemical Formula 5, but is not limited thereto.

[Chemical Formula 5]

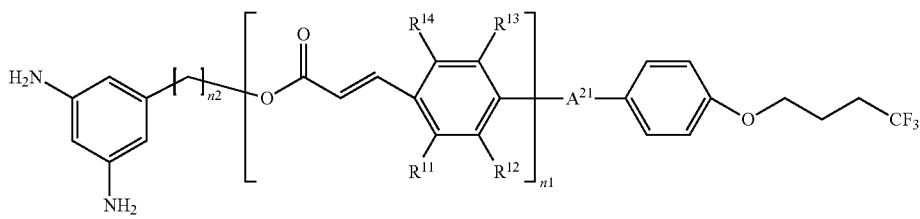

In Chemical Formula 5, $A^{21}$ is —O—, —OOC— or —COO—, $R^{11}$ to $R^{14}$ are the same or different and are each independently hydrogen or substituted or unsubstituted C1 to C10 alkyl, n1 is an integer ranging from 2 to 4, and n2 is an integer ranging from 0 to 2.

Diamines of Chemical Formulae 3, 4, and 5 can be synthesized by the skilled artisan without undue experimentation.

Suitable starting materials for the synthesis of the diamines can be commercially available and/or can be readily synthesized by the skilled artisan also without undue experimentation.

The liquid crystal alignment agent may further include a solvent and other additives other than the polymer. Hereinafter, the components are described in detail.

Polymer

The polymer is a photo-polymer including polyamic acid including a repeating unit represented by Chemical Formula 1, polyimide including a repeating unit represented by Chemical Formula 2, or a combination thereof.

The polymers carry out reactions such as photo-isomerization, photo-cross linking or the like in an anisotropical way. Thereby, anisotropy occurs on the polymer surface to induce the molecular alignment of liquid crystal in one direction.

The polyamic acid including a repeating unit represented by Chemical Formula 1 may be synthesized from acid dianhydride, the diamine represented by Chemical Formula 3 and/or the diamine represented by Chemical Formula 4. The method of preparing a polyamic acid by copolymerizing the acid dianhydride and the diamine represented by Chemical Formula 3 and/or the diamine represented by Chemical Formula 4 may include any conventional methods known for synthesizing the polyamic acid.

The polyimide including a repeating unit represented by Chemical Formula 2 may be synthesized from acid dianhydride, the diamine represented by Chemical Formula 3 and/or the diamine represented by Chemical Formula 4. The method of copolymerizing and imidizing the acid dianhydride and the diamine represented by Chemical Formula 3 and/or the diamine represented by Chemical Formula 4 to provide a polyimide is well known in the art, so the detailed description is omitted.

The acid dianhydride may include alicyclic acid dianhydride, aromatic acid dianhydride, or a mixture thereof.

Examples of the alicyclic acid dianhydride may include without limitation 1,2,3,4-cyclobutanetetracarboxylic acid dianhydride (CBDA), 5-(2,5-dioxotetrahydropuryl)-3-methylcyclohexene-1,2-dicarboxylic acid anhydride (DOCDA), bicyclooctene-2,3,5,6-tetracarboxylic acid dianhydride (BODA), 1,2,3,4-cyclopentanetetracarboxylic acid dianhydride (CPDA), 1,2,4,5-cyclohexanetetracarboxylic acid dianhydride (CHDA), 1,2,4-tricarboxyl-3-methylcarboxyl cyclopentane dianhydride, 1,2,3,4-tetracarboxyl cyclopentane dianhydride, 4,10-dioxa-tricyclo[6.3.1.0$^{2,7}$]dodecane-3,5,9,11-tetraone, and the like, and mixtures thereof.

Examples of the tetravalent organic group derived from the alicyclic acid dianhydride may include without limitation a functional group represented by the following Chemical Formulae 9 to 14, or a combination thereof.

[Chemical Formula 9]

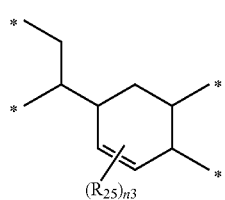

[Chemical Formula 10]

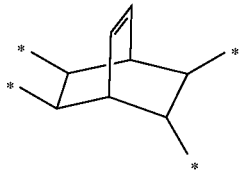

[Chemical Formula 11]

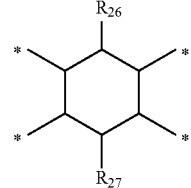

[Chemical Formula 12]

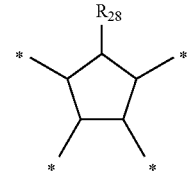

[Chemical Formula 13]

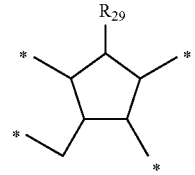

[Chemical Formula 14]

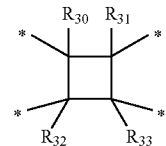

In Chemical Formulae 9 to 14, each $R_{25}$ is the same or different and is each independently substituted or unsubstituted alkyl, substituted or unsubstituted aryl, or substituted or unsubstituted heteroaryl, $n_3$ is an integer ranging from 0 to 3, and $R_{26}$ to $R_{33}$ are the same or different and are each independently hydrogen, substituted or unsubstituted alkyl, substituted or unsubstituted aryl, or substituted or unsubstituted heteroaryl.

When $n_3$ is an integer of 2 or more, each $R_{25}$ may be the same or different from each other.

Examples of the aromatic acid dianhydride may include without limitation pyromellitic dianhydride (PMDA), biphthalic dianhydride (BPDA), oxydiphthalic dianhydride (ODPA), benzophenonetetracarboxylic acid dianhydride (BTDA), hexafluoroisopropylidene diphtlialic dianhydride (6-FDA), and the like, and mixtures thereof.

The tetravalent organic group derived from the aromatic acid dianhydride may include without limitation a functional group represented by the following Chemical Formulae 15 and 16, or a combination thereof.

[Chemical Formula 15]

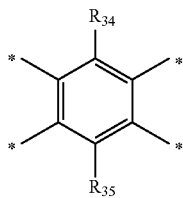

[Chemical Formula 16]

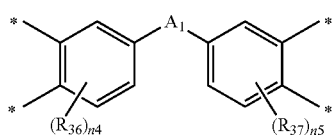

In Chemical Formulae 15 and 16, $R_{34}$ and $R_{35}$ are the same or different and are each independently hydrogen, substituted or unsubstituted alkyl, substituted or unsubstituted aryl, or substituted or unsubstituted heteroaryl, each $R_{36}$ and $R_{37}$ is the same or different and each is independently substituted or unsubstituted alkyl, substituted or unsubstituted aryl, or substituted or unsubstituted heteroaryl, $n_4$ and $n_5$ are independently integers ranging from 0 to 3, and $A_1$ is a single bond, O, CO, substituted or unsubstituted C1 to C6 alkylene (e.g., $C(CF_3)_2$), substituted or unsubstituted C3 to C30 cycloalkylene, or substituted or unsubstituted C2 to C30 heterocycloalkylene.

When $n_4$ is an integer of 2 or more, each $R_{36}$ may be the same or different from each other. When $n_5$ is an integer of 2 or more, each $R_{37}$ may be the same or different from each other.

The polyamic acid and the polyimide may each have a weight average molecular weight of about 50,000 to about 500,000. When the polyamic acid and polyimide has the weight average molecular weight within the above range, this may effectively improve solubility, thermal stability, and chemical resistance and maintain an appropriate viscosity to readily provide excellent printability and an uniform film.

When the liquid crystal alignment agent includes both the polyamic acid and the polyimide, the polyamic acid and the polyimide may be included at a weight ratio of about 1:99 to about 50:50, for example, the polyamic acid and the polyimide may be included at a weight ratio of about 10:90 to about 50:50.

In some embodiments, the combination of the polyamic acid and the polyimide may include the polyamic acid in an amount of about 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50 wt %. Further, according to some embodiments of the present invention, the amount of the polyamic acid can be in a range from about any of the foregoing amounts to about any other of the foregoing amounts.

In some embodiments, the combination of the polyamic acid and the polyimide may include the polyimide in an amount of about 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, or 99 wt %. Further, according to some embodiments of the present invention, the amount of the polyimide can be in a range from about any of the foregoing amounts to about any other of the foregoing amounts.

When the polyamic acid and the polyimide are included in an amount within the above range, this may improve the alignment stability.

The liquid crystal alignment agent may include the polymer in an amount of about 1 wt % to about 30 wt %, for example about 3 wt % to about 20 wt %, based on the total weight of the liquid crystal alignment agent. In some embodiments, the liquid crystal alignment agent may include the polymer in an amount of about 1, 2, 3, 4, 5, 6, 7, 8, 9, 10, 11, 12, 13, 14, 15, 16, 17, 18, 19, 20, 21, 22, 23, 24, 25, 26, 27, 28, 29, or 30 wt %. Further, according to some embodiments of the present invention, the amount of the polymer can be in a range from about any of the foregoing amounts to about any other of the foregoing amounts. When the polymer is included in an amount within the above range, it may improve printability and liquid crystal alignment properties.

Solvent

The liquid crystal alignment agent may include an appropriate solvent for dissolving the polymer. In this manner, the liquid crystal alignment agent may have excellent spreadability and excellent adhesiveness to a substrate.

Examples of solvent suitable for dissolving the polymer may include without limitation N-methyl-2-pyrrolidone; N,N-dimethyl acetamide; N,N-dimethyl formamide; dimethyl sulfoxide; γ-butyrolactone; tetrahydrofuran (THF); phenol-based solvents such as meta cresol, phenol, halogenated phenols, and the like, and combinations thereof.

The solvent may further include 2-butyl cellosolve (2-BC), to improve printability. The solvent may include 2-butyl cellosolve in an amount of about 1 to about 70 wt %, for example, about 20 to about 60 wt %, based on the total amount of solvent including 2-butyl cellosolve. In some embodiments, the solvent may include 2-butyl cellosolve in an amount of about 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 48, 50, 51, 52, 53, 54, 55, 56, 57, 58, 59, 60, 61, 62, 63, 64, 65, 66, 67, 68, 69, or 70 wt %. Further, according to some embodiments of the present invention, the amount of 2-butyl cellosolve can be in a range from about any of the foregoing amounts to about any other of the foregoing amounts.

When the 2-butyl cellosolve is included in an amount within the above range, it may easily improve printability.

In addition, the solvent may further include a poor solvent. Examples of poor solvent include without limitation alcohols, ketones, esters, ethers, hydrocarbons, halogenated hydrocarbons, and the like, and combinations thereof. The poor solvent can be present in an appropriate ratio as long as the soluble polyimide polymer is not deposited. The poor solvent may lower surface energy of a liquid crystal photo-alignment agent and improve its spreadability and flatness when the liquid crystal photo-alignment agent is coated onto a substrate.

The liquid crystal alignment agent can include the poor solvent in an amount of about 1 to about 90 volume %, for example about 1 to about 70 volume %, based on the total amount of the solvent. In some embodiments, the liquid crystal alignment agent can include the poor solvent in an amount of about 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 48, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, or 90 volume %. Further, according to some embodiments of the present invention, the amount of the poor solvent can be in a range from about any of the foregoing amounts to about any other of the foregoing amounts.

Examples of the poor solvent may include without limitation methanol, ethanol, isopropanol, cyclohexanol, ethylene glycol, propylene glycol, 1,4-butanediol, triethylene glycol, acetone, methylethylketone, cyclohexanone, methylacetate, ethylacetate, butylacetate, diethyloxalate, malonic acid ester, diethylether, ethylene glycol monomethylether, ethylene glycol dimethylether, ethylene glycol monoethylether, ethylene glycol phenylether, ethylene glycol phenylmethylether, ethylene glycol phenylethylether, diethylene glycol dimethylether, diethylene glycol ether, diethylene glycol monomethylether, diethylene glycol monoethylether, diethylene glycol monomethylether acetate, diethylene glycol monoethylether acetate, ethylene glycol methylether acetate, ethylene glycol ethylether acetate, 4-hydroxy-4-methyl-2-pentanone, 2-hydroxy ethyl propionate, 2-hydroxy-2-methyl ethyl propionate, ethoxy ethyl acetate, hydroxy ethyl acetate, 2-hydroxy-3-methyl methyl butanoate, 3-methoxy methyl propionate, 3-methoxy ethyl propionate, 3-ethoxy ethyl propionate, 3-ethoxy methyl propionate, methyl methoxy butanol, ethyl methoxy butanol, methyl ethoxy butanol, ethyl ethoxy butanol, tetrahydrofuran, dichloromethane, 1,2-dichloroethane, 1,4-dichloro butane, trichloro ethane, chlorobenzene, o-dichlorobenzene, hexane, heptane, octane, benzene, toluene, xylene, and the like, and mixtures thereof.

The amount of solvent is not limited in the liquid crystal alignment agent, but the solid content of the liquid crystal alignment agent ranges from about 1 to about 30 wt %, for example about 3 to about 20 wt %. In some embodiments, the liquid crystal alignment agent may have a solid content of about 1, 2, 3, 4, 5, 6, 7, 8, 9, 10, 11, 12, 13, 14, 15, 16, 17, 18, 19, 20, 21, 22, 23, 24, 25, 26, 27, 28, 29, or 30 wt %. Further, according to some embodiments of the present invention, the solid content of the liquid crystal alignment agent can be in a range from about any of the foregoing amounts to about any other of the foregoing amounts. When the solid content is in an amount within the above range, the liquid crystal alignment agent may be less affected by impurities on a substrate surface during printing and may maintain appropriate film uniformity and appropriate viscosity. This may prevent deterioration of film uniformity due to high viscosity during the printing process and may provide appropriate transmittance.

Other Additive(s)

The liquid crystal alignment agent according to one embodiment may optionally further include one or more other additives.

The other additives may include an epoxy compound. The epoxy compound can improve the reliability and the electro-optical characteristics. The epoxy compound may include at least one kind of epoxy compound having 2 to 8 epoxy groups, for example, 2 to 4 epoxy groups.

The liquid crystal alignment agent may include the epoxy compound in an amount of about 0.1 to about 50 parts by weight, for example, about 1 to about 30 parts by weight, based on about 100 parts by weight of the polymer. When the epoxy compound is included in an amount within the above range, it may provide appropriate printability and flatness during coating on the substrate, and it may easily improve reliability and electro-optical properties.

Examples of the epoxy compound may include without limitation N,N,N',N'-tetraglycidyl-4,4'-diaminophenylmethane (TGDDM), N,N,N',N'-tetraglycidyl-4,4'-diaminophenylethane, N,N,N',N'-tetraglycidyl-4,4'-diaminophenylpropane, N,N,N',N'-tetraglycidyl-4,4'-diaminophenylbutane, N,N,N',N'-tetraglycidyl-4,4'-diaminobenzene, ethyleneglycoldiglycidylether, polyethyleneglycoldiglycidylether, propyleneglycoldiglycidylether, tripropyleneglycoldiglycidylether, polypropyleneglycoldiglycidylether, neopentylglycoldiglycidylether, 1,6-hexanedioldiglycidylether, glycerinediglycidylether, 2,2-dibromoneopentylglycoldiglycidylether, 1,3,5,6-tetraglycidyl-2,4-hexanediol, N,N,N',N'-tetraglycidyl-1,4-phenylenediamine, N,N,N',N'-tetraglycidyl-m-xylenediamine, N,N,N',N'-tetraglycidyl-2,2'-dimethyl-4,4'-diaminobiphenyl, 2,2-bis[4-(N,N-diglycidyl-4-aminophenoxy)phenyl]propane, N,N,N',N'-tetraglycidyl-4,4'-diaminodiphenylmethane, 1,3-bis(N,N-diglycidylaminomethyl)cyclohexane, 1,3-bis(N,N-diglycidylaminomethyl)benzene, and the like, and combinations thereof.

In addition, in order to improve printability, the liquid crystal alignment agent may further include an appropriate surfactant or a coupling agent as an additive.

A liquid crystal alignment film may be obtained by using the liquid crystal alignment agent.

The liquid crystal alignment film may be fabricated by coating the liquid crystal alignment agent that is dissolved in the organic solvent on a substrate. The liquid crystal alignment agent may be coated on the substrate using a method such as but not limited to spin coating, flexo printing, inkjet printing and the like. The flexo printing can accomplish excellent uniformity of a film and may easily form a larger liquid crystal photo-alignment film.

The substrate is not particularly limited, as long as it is transparent. Examples of the substrate include without limitation glass substrates, plastic substrates such as acrylic substrates and polycarbonate substrates, and the like. In addition, the substrate may include a substrate including an indium-tin oxide (ITO) electrode and the like for liquid crystal operation to simplify manufacturing processes.

In order to improve uniformity of a film, the liquid crystal alignment agent may be uniformly coated on a substrate and pre-dried at a temperature ranging from room temperature to about 200° C., for example about 30 to about 150° C., and as another example about 40 to about 120° C., for about 1 to about 100 minutes. The pre-drying can control volatilization of each component of the liquid crystal alignment agent to provide a uniform film with minimal or no thickness deviation.

Then, the coated substrate can be fired at a temperature of about 80 to about 300° C. for example about 120 to about 280° C. for about 5 to about 300 minutes to completely evaporate solvent to provide a liquid crystal alignment film.

The liquid crystal alignment film can be used for a liquid crystal display with uniaxial alignment treatment by polarized ultraviolet (UV) rays or rubbing, or without the uniaxial alignment treatment for some uses such as a vertical alignment film and the like.

The liquid crystal alignment film according to one embodiment of the present invention may be subjected to uniaxial alignment treatment by exposing to light with energy of about 10 mJ to about 5000 mJ for about 0.1 to about 180 minutes.

According to a further embodiment of the present invention, a display device including the liquid crystal alignment film is provided.

The liquid crystal display device (LCD) can include a 90 degree-twisted liquid crystal between a polarizer and an analyzer having polarized directions perpendicular to each other. When voltage is not applied, the linear polarized light passing through a polarizer locally rotates according to the direction of other liquid crystal aligner to polarize in 90 degree. Accordingly, the light is rotated when passing through the liquid crystal layer and passed through the analyzer. When applying voltage, the liquid crystal is aligned in a direction parallel to the electric field direction, and the linearly polarized light is passed through the liquid crystal layer without rotating so blocked by the analyzer having a polarized direction perpendicular to the direction of polarizer. By controlling the liquid crystal as described above, it may selectively transmit light. Accordingly, it is very important to uniformly align the liquid crystal in the whole LCD panel in order to provide uniform brightness and high contrast ratio in the LCD. The liquid crystal alignment film may be used in this regard.

In addition, for example, the liquid crystal display may be fabricated by coating a liquid crystal alignment agent on a glass substrate deposited with an indium tin oxide (ITO) conductive layer, thermally curing the same to provide an alignment film, assembling two substrates to face each other; and injecting liquid crystal; or dipping liquid crystal on one substrate, and assembling the same with the counter substrate.

The following examples illustrate the present invention in more detail. These examples, however, should not in any sense be interpreted as limiting the scope of the present invention.

EXAMPLE

Comparative Example 1

Preparation of Poly Amic Acid (PSA-1)

0.5 mol of 4-{2-[2-(2,4-diamino-phenyl)-ethoxycarbonyl]-vinyl}-phenyl 4-(4,4,4-trifluorobutoxy)-benzoate ester represented by the following Chemical Formula 6 is placed into a four-necked flask with an agitator and a temperature controller, while nitrogen gas is passed therethrough under dark room conditions, and N-methyl-2-pyrrolidone (NMP) is added to dissolve the compound represented by Chemical Formula 6 into NMP. 1.0 mol of the solid 4,10-dioxa-tricyclo[6.3.1.0$^{2,7}$]dodecane-3,5,9,11-tetraone is added and vigorously agitated. After agitating for one hour, 0.5 mol of 4-{2-[2-(2,4-diamino-phenyl)ethoxycarbonyl]-vinyl}-phenyl 4-(4,4,4-trifluorobutoxy)-benzoate ester represented by Chemical Formula 6 is added and reacted to provide an appropriate viscosity. The obtained solution has a solid content of 30 wt %, and the solution is copolymerized for 24 hours to provide a polyamic acid solution.

[Chemical Formula 6]

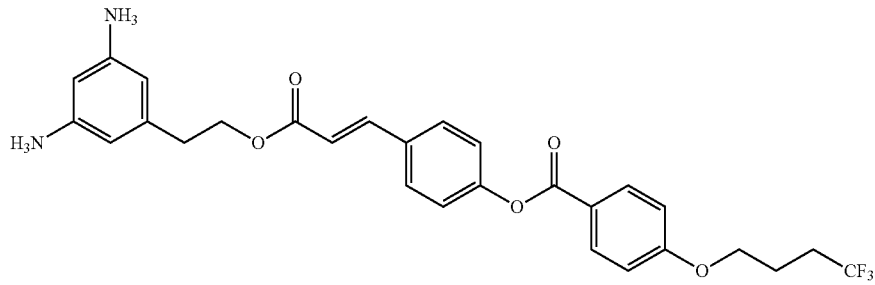

Example 1

Preparation of Poly Amic Acid (PSA-2)

0.5 mol of 4-{2-[2-(2,4-diamino-phenyl)-ethoxycarbonyl]-vinyl}-phenyl 4-(4,4,4-trifluorobutoxy)-benzoate ester is placed into a four-necked flask with an agitator, a temperature controller, and a nitrogen gas injector, while passing nitrogen gas therethrough under dark room conditions, and N-methyl-2-pyrrolidone (NMP) is added to dissolve the compound represented by Chemical Formula 6 into NMP. 1.0 mol of the solid 4,10-dioxa-tricyclo[6.3.1.0$^{2,7}$]dodecane-3,5,9, 11-tetraone is added and vigorously agitated. After agitating for one hour, 0.4 mol of 4-{2-[2-(2,4-diamino-phenyl)-ethoxycarbonyl]-vinyl}phenyl 4-(4,4,4-trifluorobutoxy)-benzoate ester represented by Chemical Formula 6 and 0.1 mol of the compound represented by Chemical Formula 7 are added and reacted to provide an appropriate viscosity. The obtained solution has a solid content of 30 wt %, and the solution is copolymerized for 24 hours to provide a polyamic acid solution.

[Chemical Formula 7]

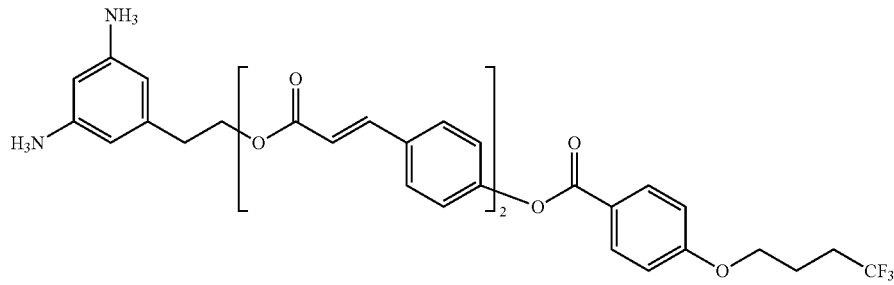

Examples 2 to 5

Preparation of Poly Amic Acid (PSA-3 to 6)

Polyamic acid (PSA-3 to 5) solutions are prepared according to the same method as in Example 1, except that 4-{2-[2-(2,4-diamino-phenyl)-ethoxycarbonyl]-vinyl}-phenyl 4-(4, 4,4-trifluorobutoxy)-benzoate ester represented by Chemical Formula 6 and the compound represented by Chemical Formula 7 are added in amounts shown in the following Table 1. In Table 1, the amounts of 4-{2-[2-(2,4-diamino-phenyl)-ethoxycarbonyl]-vinyl}-phenyl 4-(4,4,4-trifluorobutoxy)-benzoate ester represented by Chemical Formula 6 is the sum of the first and second addition amounts, and the first addition amount thereof is 0.5 mol in all Examples.

Comparative Example 2

Preparation of Poly Amic Acid (PSI-1)

0.5 mol of 4-{2-[2-(2,4-diamino-phenyl)-ethoxycarbonyl]-vinyl}-phenyl 4-(4,4,4-trifluorobutoxy)-benzoate ester represented by Chemical Formula 6 is placed into a four-necked flask with an agitator, a temperature controller, and a nitrogen gas injector, while passing nitrogen gas therethrough under dark room conditions, and N-methyl-2-pyrrolidone (NMP) is added thereto to dissolve it. 1.0 mol of the solid 4,10-dioxa-tricyclo[6.3.1.0$^{2,7}$]dodecane-3,5,9,11-tetraone is added and vigorously agitated. After agitating for one hour, 0.5 mol of 4-{2-[2-(2,4-diamino-phenyl)-ethoxycarbonyl]-vinyl}-phenyl 4-(4,4,4-trifluorobutoxy)-benzoate ester represented by Chemical Formula 6 is added and reacted to provide an appropriate viscosity. The obtained solution has a solid content of 30 wt %, and the solution is copolymerized for 24 hours to provide a polyamic acid solution.

This polyamic acid solution is mixed with 3.0 mol of acetic anhydride and 5.0 mol of pyridine. The resulting mixture is heated up to 80° C. and reacted for 6 hours and vacuum-distilled to remove a catalyst and a solvent, preparing a soluble polyimide resin having a solid content of 20 wt %.

Example 6

Preparation of Poly Imide (PSI-2)

0.5 mol of 4-{2-[2-(2,4-diamino-phenyl)-ethoxycarbonyl]-vinyl}-phenyl 4-(4,4,4-trifluorobutoxy)-benzoate ester represented by Chemical Formula 6 is placed into a four-necked flask with an agitator, a temperature controller, and a nitrogen gas injector, while passing nitrogen gas therethrough under dark room conditions, and N-methyl-2-pyrrolidone (NMP) is added thereto to dissolve it. 1.0 mol of the solid 4,10-dioxa-tricyclo[6.3.1.0$^{2,7}$]dodecane-3,5,9,11-tetraone is added and vigorously agitated. After agitating for one hour, 0.4 mol of 4-{2-[2-(2,4-diamino-phenyl)-ethoxycarbonyl]-vinyl}-phenyl 4-(4,4,4-trifluorobutoxy)-benzoate ester represented by Chemical Formula 6 and 0.1 mol of a compound represented by the above Chemical Formula 7 are added and reacted to provide an appropriate viscosity. The obtained solution has a solid content of 30 wt %, and the solution is copolymerized for 24 hours to provide a polyamic acid solution.

This polyamic acid solution is mixed with 3.0 mol of acetic anhydride and 5.0 mol of pyridine. The resulting mixture is heated up to 80° C. and reacted for 6 hours and then, vacuum-distilled to remove a catalyst and a solvent, preparing a soluble polyimide resin having a solid content of 20 wt %.

Examples 7 to 10

Preparation of Poly Imide (PSI-3 to 6)

Polyimide (PSI-3 to 6) solutions are prepared according to the same method as in Example 6 except for using 4-{2-[2-(2,4-diamino-phenyl)ethoxycarbonyl]-vinyl}-phenyl 4-(4,4,4-trifluorobutoxy)-benzoate ester represented by Chemical Formula 6 and a compound represented by the above Chemical Formula 7 as shown in the following Table 1. In Table 1, the amount of 4-{2-[2-(2,4-diamino-phenyl)-ethoxycarbonyl]-vinyl}-phenyl 4-(4,4,4-trifluorobutoxy)-benzoate ester represented by the above Chemical Formula PIP1 is the sum of first and second addition amounts. In all Examples, the first addition amount is 0.5 mol.

TABLE 1

|  | Preparation Example | Chemical Formula 6 | Chemical Formula 7 | Type |
|---|---|---|---|---|
| Comparative Example 1 | PSA-1 | 100 | — | polyamic acid |
| Example 1 | PSA-2 | 90 | 10 | polyamic acid |
| Example 2 | PSA-3 | 80 | 20 | polyamic acid |
| Example 3 | PSA-4 | 70 | 30 | polyamic acid |
| Example 4 | PSA-5 | 60 | 40 | polyamic acid |
| Example 5 | PSA-6 | 50 | 50 | polyamic acid |
| Comparative Example 2 | PSI-1 | 100 | — | polyimide |
| Example 6 | PSI-2 | 90 | 10 | polyimide |
| Example 7 | PSI-3 | 80 | 20 | polyimide |
| Example 8 | PSI-4 | 70 | 30 | polyimide |
| Example 9 | PSI-5 | 60 | 40 | polyimide |
| Example 10 | PSI-6 | 50 | 50 | polyimide |

In the above Table 1, amounts of the compounds represented by Chemical Formulae 6 and 7 are mol % based on the total moles of diamine used to prepare a polymer.

<Property Evaluation>

Evaluation of Liquid Crystal Alignment Properties

A liquid crystal cell is used to evaluate vertical alignment properties of liquid crystal alignment agents. The liquid crystal cell is fabricated as follows.

A standardized indium-tin oxide (ITO) glass substrate is patterned using photolithography to remove ITO except for a 1.5 cm×1.5 cm square-shaped ITO and an ITO electrode shape for voltage application.

The liquid crystal alignment agents of Examples 1 to 10 and Comparative Examples 1 and 2 are spin-coated to a thickness of 0.1 µm thick on the patterned ITO substrate and cured at a temperature of 70° C. and 210° C.

The cured ITO substrate is exposed to a light under a predetermined angle and a predetermined energy by using an exposure device (UIS-S2021J7-YD01, Ushio LPUV). Two exposed substrates are bonded together by arranging the substrates in an opposite exposure direction (VA mode, 90°) and maintaining a cell gap of 4.75 µm while ITO square shapes at the top and bottom are aligned. The exposure is performed by using a light source of a 2 kW deep UV lamp (UXM-2000).

The obtained liquid crystal cell is filled with a liquid crystal. Liquid crystal alignment properties of each liquid crystal cell are measured by using a perpendicularly polarized optical microscope. A pretilt angle is measured using a crystal diffraction method (crystal rotation method). The results are shown in the following Table 2. The references for evaluating the liquid crystal alignment properties are follows:

<Reference for Evaluating Liquid Crystal Alignment Properties>

Good: finding no disclination
Bad: finding disclination

Voltage-Transmittance Property Evaluation of a Liquid Crystal Alignment Film

The voltage-transmittance of the liquid crystal alignment films is measured using a liquid crystal cell with 4.75 µm cell gap to evaluate electric characteristic. The results are provided in the following Table 2.

<Voltage-Transmittance Property Evaluation Reference>

Good: 99.0% or more
Middle: 98.5% or more and 99.0% or less
Bad: 98.5% or less

Photo-Reactivity Evaluation of a Liquid Crystal Alignment Film

The liquid crystal alignment agents according to Examples 1 to 10 and Comparative Examples 1 to 2, respectively, are applied on a cleaned quartz substrate and spin-coated to a thickness of 0.1 μm thick and then pre-dried on a 80° C. hot plate for 90 seconds.

The pre-dried alignment film substrate is baked on a 220° C. hot plate for 15 minutes and exposed to a light with 10 mJ of energy for 3 to 10 seconds, fabricating a substrate printed with an alignment film. The UV absorption of the substrate is measured by evaluating structural change due to exposure using a Resier's method. The results are provided in Table 2.

<Photo-Reactivity Evaluation Reference>

4: photo-reactivity of 25% or more

3: photo-reactivity of 20% or more and less than 25%

2: photo-reactivity of 10% or more and less than 20%

1: photo-reactivity of less than 10%

TABLE 2

| | Preparation Example | Alignment properties | Voltage-transmittance | Photo-reactivity |
|---|---|---|---|---|
| Comparative Example 1 | PSA-1 | Good | middle | 2 |
| Example 1 | PSA-2 | Good | middle | 3 |
| Example 2 | PSA-3 | Good | Good | 3 |
| Example 3 | PSA-4 | Good | Good | 4 |
| Example 4 | PSA-5 | Good | Good | 4 |
| Example 5 | PSA-6 | Good | middle | 4 |
| Comparative Example 2 | PSI-1 | Good | middle | 2 |
| Example 6 | PSI-2 | Good | Good | 3 |
| Example 7 | PSI-3 | Good | Good | 3 |
| Example 8 | PSI-4 | Good | Good | 3 |
| Example 9 | PSI-5 | Good | Good | 4 |
| Example 10 | PSI-6 | Good | middle | 4 |

Many modifications and other embodiments of the invention will come to mind to one skilled in the art to which this invention pertains having the benefit of the teachings presented in the foregoing descriptions. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation, the scope of the invention being defined in the claims.

What is claimed is:

1. A liquid crystal alignment agent, comprising
a polymer comprising polyamic acid including a repeating unit represented by the following Chemical Formula 1, polyimide including a repeating unit represented by the following Chemical Formula 2, or a combination thereof:

[Chemical Formula 1]

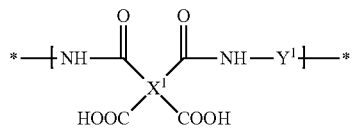

[Chemical Formula 2]

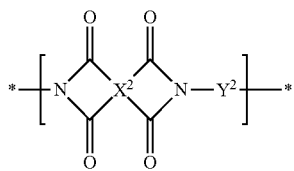

wherein, in Chemical Formulae 1 and 2, $X^1$ and $X^2$ are the same or different and are each independently a tetravalent organic group derived from alicyclic acid dianhydride or aromatic acid dianhydride, and $Y^1$ and $Y^2$ are the same or different and are each independently a divalent organic group derived from diamine, wherein the diamine includes a diamine or a combination thereof represented by the following Chemical Formula 3,

[Chemical Formula 3]

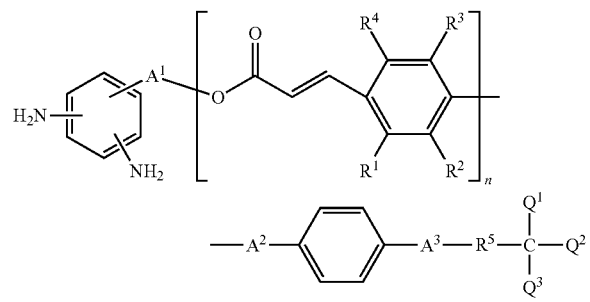

wherein, in Chemical Formula 3, $A^1$ is a single bond or C1 to C2 alkylene, $A^2$ is substituted or unsubstituted C1 to C30 alkylene or C1 to C10 alkylene in which at least one —$CH_2$— group thereof is independently replaced with —O—, —OOC—, —COO—, —OCOO—, —NHCO—, —CONH— or —CO—, $A^3$ is a single bond, O, $SO_2$, or $C(R_{103})(R_{104})$, wherein $R_{103}$ and $R_{104}$ are the same or different and are independently hydrogen or substituted or unsubstituted C1 to C6 alkyl, $R^1$ to $R^4$ are the same or different and are each independently hydrogen, substituted or unsubstituted C1 to C30 alkyl, substituted or unsubstituted C6 to C30 aryl, or substituted or unsubstituted C2 to C30 heteroaryl, $R^5$ is substituted or unsubstituted C1 to C30 alkylene or C1 to C30 alkylene in which at least one —$CH_2$— group thereof is replaced with —CO—, —CO—O—, —NW—, —NWCO—, —CO—NW— or —CH=CH—, wherein W is hydrogen or C1 to C10 alkyl, with the proviso that oxygen atoms are not directly bound to one another, $Q^1$, $Q^2$ and $Q^3$ are each independently hydrogen or halogen, and n is an integer ranging from 2 to 4, wherein the term substituted refers to one or more substituents selected from the group consisting of halogen, hydroxy, nitro, cyano, amino, amidino, hydrazine, hydrazone, carboxyl, alkyl, haloalkyl, alkoxy, alicyclic organic groups, aryl, alkenyl, alkynyl, heteroaryl, heterocycloalkyl, and combinations thereof and wherein the terms heteroaryl and heterocycloalkyl are aryl and cycloalkyl, respectively, including 1 to 3 heteroatoms selected from the group consisting of N, O, S, Si, P, and combinations thereof.

2. The liquid crystal alignment agent of claim 1, wherein the diamine further comprises a diamine or a combination of diamines represented by the following Chemical Formula 4:

[Chemical Formula 4]

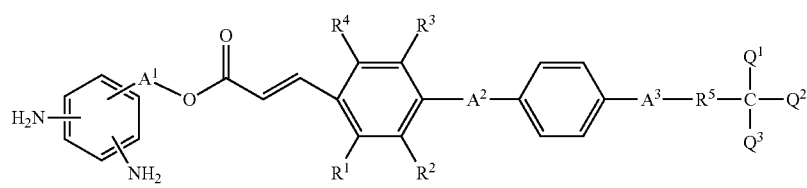

wherein, in Chemical Formula 4, $A^1$ is a single bond or C1 to C2 alkylene, $A^2$ is substituted or unsubstituted C1 to C30 alkylene or C1 to C10 alkylene in which at least one —$CH_2$— group thereof is replaced with —O—, —OOC—, —COO—, —OCOO—, —NHCO—, —CONH— or —CO—, $A^3$ is a single bond, O, $SO_2$, or $C(R_{103})(R_{104})$, wherein $R_{103}$ and $R_{104}$ are the same or different and are independently hydrogen or substituted or unsubstituted C1 to C6 alkyl, $R^1$ to $R^4$ are the same or different and are each independently hydrogen, substituted or unsubstituted C1 to C30 alkyl, substituted or unsubstituted C6 to C30 aryl, or substituted or unsubstituted C2 to C30 heteroaryl, $R^5$ is substituted or unsubstituted C1 to C30 alkylene or C1 to C30 alkylene in which at least one —$CH_2$— group thereof is replaced with —CO—, —CO—O—, —NW—, —NWCO—, —CO—NW— or —CH═CH—, wherein W is hydrogen or C1 to C10 alkyl, with the proviso that oxygen atoms are not directly bound to one another, and $Q^1$, $Q^2$ and $Q^3$ are each independently hydrogen or halogen wherein the term substituted has the same meaning as in claim 1.

3. The liquid crystal alignment agent of claim 2, wherein the diamine comprises about 20 mol % to about 90 mol % of the diamine represented by Chemical Formula 3 and about 10 mol % to about 80 mol % of the diamine represented by Chemical Formula 4 based on the total amount of the diamine.

4. The liquid crystal alignment agent of claim 1, wherein the diamine represented by Chemical Formula 3 is a diamine or a combination of diamines represented by the following Chemical Formula 5:

wherein, in Chemical Formula 5, $A^{21}$ is, —O—, —OOC— or —COO—, $R^{11}$ to $R^{14}$ are the same or different and are each independently hydrogen or substituted or unsubstituted C1 to C10 alkyl, wherein the term substituted has the same meaning as in claim 1, n1 is an integer ranging from 2 to 4, and n2 is an integer ranging from 0 to 2.

5. The liquid crystal alignment agent of claim 1, wherein the each of the polyamic acid and the polyimide has a weight average molecular weight of about 50,000 to about 500,000.

6. The liquid crystal alignment agent of claim 1, wherein the liquid crystal alignment agent comprises the polyamic acid and the polyimide at a weight ratio of about 1:99 to about 50:50.

7. The liquid crystal alignment agent of claim 1, wherein the liquid crystal alignment agent comprises about 1 wt % to about 30 wt % of a solid.

8. A liquid crystal alignment film manufactured by applying the liquid crystal alignment agent of claim 1 to a substrate.

9. A liquid crystal display including the liquid crystal alignment film of claim 8.

10. The liquid crystal alignment agent of claim 1, wherein the diamine represented by Chemical Formula 3 is a diamine represented by the following Chemical Formula 7:

[Chemical Formula 5]

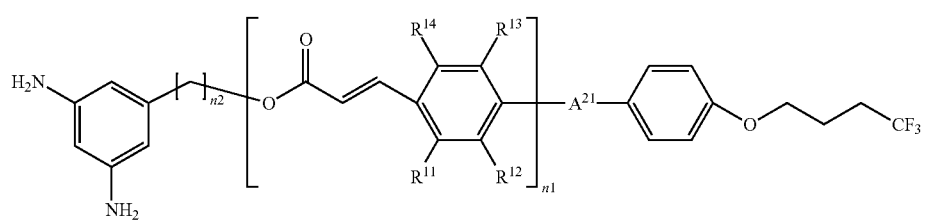

[Chemical Formula 7]
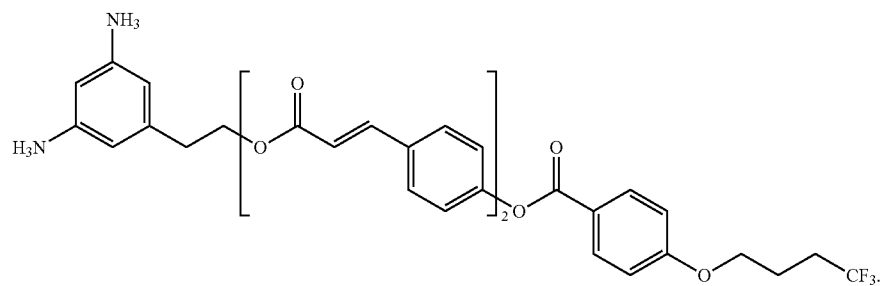
* * * * *